(12) United States Patent
Henry et al.

(10) Patent No.: US 8,381,374 B2
(45) Date of Patent: Feb. 26, 2013

(54) SHOWER CURTAIN FASTENER WITH INTEGRAL HOOK

(75) Inventors: Lou Henry, Scarsdale, NY (US); James Kwon, Sunnyside, NY (US)

(73) Assignee: Town & Country Linen Corp., New York, NY (US)

( * ) Notice: Subject to any disclaimer, the term of this patent is extended or adjusted under 35 U.S.C. 154(b) by 706 days.

(21) Appl. No.: 12/582,349

(22) Filed: Oct. 20, 2009

(65) Prior Publication Data

US 2011/0088231 A1 Apr. 21, 2011

(51) Int. Cl.
*A47H 13/02* (2006.01)
*A47H 13/01* (2006.01)

(52) U.S. Cl. ............... 24/716; 24/370; 24/373; 24/907; 248/215; 160/330

(58) Field of Classification Search ............... 24/716, 24/370, 373, 375, 907, 598.2, 598.6, 600.2, 24/600.4, 600.6, 601.6; 248/214, 215, 227.4, 248/340, 125.9; 160/330, 404; D8/367, D8/372

See application file for complete search history.

(56) References Cited

U.S. PATENT DOCUMENTS

| | | | |
|---|---|---|---|
| D19,322 S | 10/1889 | Campbell | |
| 635,295 A | 10/1899 | Brown | |
| 842,215 A * | 1/1907 | Mansson | 24/598.5 |
| 1,219,199 A * | 3/1917 | Troop | 24/598.2 |
| 1,709,235 A * | 4/1929 | Shaffer | 24/375 |
| 2,705,385 A | 4/1955 | Markward | |
| 3,122,803 A * | 3/1964 | Guy et al. | 24/373 |
| D209,467 S | 12/1967 | King | |
| 4,308,637 A * | 1/1982 | Kucera | 16/93 D |
| D295,607 S | 5/1988 | Rademacher et al. | |
| 4,832,298 A | 5/1989 | Metcalf | |
| 4,856,744 A | 8/1989 | Frankel | |
| 4,909,466 A * | 3/1990 | Matthews | 24/716 |
| 4,979,712 A | 12/1990 | Rios | |
| 5,087,007 A | 2/1992 | Gaderick | |
| D353,492 S | 12/1994 | Goodman et al. | |
| 5,624,094 A * | 4/1997 | Protz, Jr. | 24/375 |
| D436,024 S | 1/2001 | Freedland | |
| D459,201 S | 6/2002 | Michaelson | |
| D465,661 S | 11/2002 | Hoernig | |
| 6,698,061 B2 | 3/2004 | Ho | |
| D489,249 S | 5/2004 | Moore | |
| D505,614 S | 5/2005 | Barrese | |
| 7,003,848 B2 | 2/2006 | Ho | |
| D535,482 S | 1/2007 | Jackson | |
| D551,010 S | 9/2007 | Woodhouse | |
| D560,924 S | 2/2008 | Walker | |
| 7,407,142 B1 | 8/2008 | Lopez | |
| D589,331 S | 3/2009 | Zhang | |
| D600,099 S | 9/2009 | Dahlin | |

(Continued)

OTHER PUBLICATIONS

U.S. Appl. No. 61/330,805, filed May 3, 2010.

(Continued)

*Primary Examiner* — Robert J Sandy
(74) *Attorney, Agent, or Firm* — Amster, Rothstein & Ebenstein, LLP

(57) ABSTRACT

A shower curtain fastener includes a body portion adapted to couple to a shower curtain rod and a shower curtain. A hook portion formed integrally with the body portion includes a first segment extending substantially vertically downward from the bottom section of the body portion and a second segment extending outwardly to receive items apart from the shower curtain.

9 Claims, 4 Drawing Sheets

U.S. PATENT DOCUMENTS

| | | |
|---|---|---|
| D603,322 S | 11/2009 | Nicieja |
| 7,735,256 B2 | 6/2010 | Hatfield |
| D620,344 S | 7/2010 | Henry et al. |
| D636,455 S | 4/2011 | Hatfield |
| D636,456 S | 4/2011 | Hatfield |
| D636,457 S | 4/2011 | Hatfield |
| D641,231 S | 7/2011 | Stinson |
| 2006/0260040 A1 | 11/2006 | Schmidt |
| 2007/0050904 A1 | 3/2007 | Harwanko |

OTHER PUBLICATIONS

U.S. Appl. No. 12/582,646, filed Oct. 20, 2009.
U.S. Appl. No. 13/099,845, filed May 3, 2011.
U.S. Appl. No. 29/366,597, filed Jul. 27, 2010.
Photo Image of Splash Bath Essentials branded Angular Hooks as packaged, available by at least Jul. 6, 2009.

* cited by examiner

US 8,381,374 B2

SHOWER CURTAIN FASTENER WITH INTEGRAL HOOK

FIELD OF THE INVENTION

The present invention relates shower curtain fasteners. More specifically, the present invention relates to shower curtain fastener including a body portion for hanging a shower curtain on a shower curtain rod and a hook portion for hanging items apart from a shower curtain, such as towels, clothing garments, or the like.

SUMMARY OF THE INVENTION

According to one embodiment, a shower curtain fastener comprising: a ring-shaped body portion having an opening for receiving a shower curtain rod and a shower curtain, said body portion being adapted to couple said shower curtain to said shower curtain rod; and a hook portion formed integrally with the body portion, the hook portion having a first segment extending substantially vertically downward from the bottom section of the body portion and a second segment extending outwardly to receive hanging items apart from the shower curtain.

In at least one embodiment, the shower curtain fastener further comprises a locking closure for releasably securing said body portion around said shower curtain rod.

In at least one embodiment, the locking closure is a slide lock.

In at least one embodiment, the slide lock comprises a protruding portion extending from the body portion at one end of the opening, the distal end of the protruding portion having an enlarged head which is adapted to be inserted into a socket formed within the body portion adjacent the opposite end of the opening.

In at least one embodiment, the hook portion is substantially centered at the bottom section of the body portion.

In at least one embodiment, the body portion includes a notch along its inner circumferential surface for receiving the shower curtain.

In at least one embodiment, the notch is substantially centered at the bottom section of the body portion.

In at least one embodiment, the notch is located substantially adjacent to the hook portion.

In at least one embodiment, the notch and hook portion are offset at a distance to counterbalance the weight of the shower curtain and the item received thereon.

In at least one embodiment, the body portion is substantially ring shaped.

These and other features of this invention are described in, or are apparent from, the following detailed description of various exemplary embodiments of this invention.

BRIEF DESCRIPTION OF THE DRAWINGS

Example embodiments of this invention will be described with reference to the accompanying figures.

DETAILED DESCRIPTION OF THE EXAMPLE EMBODIMENTS

Figure 1:
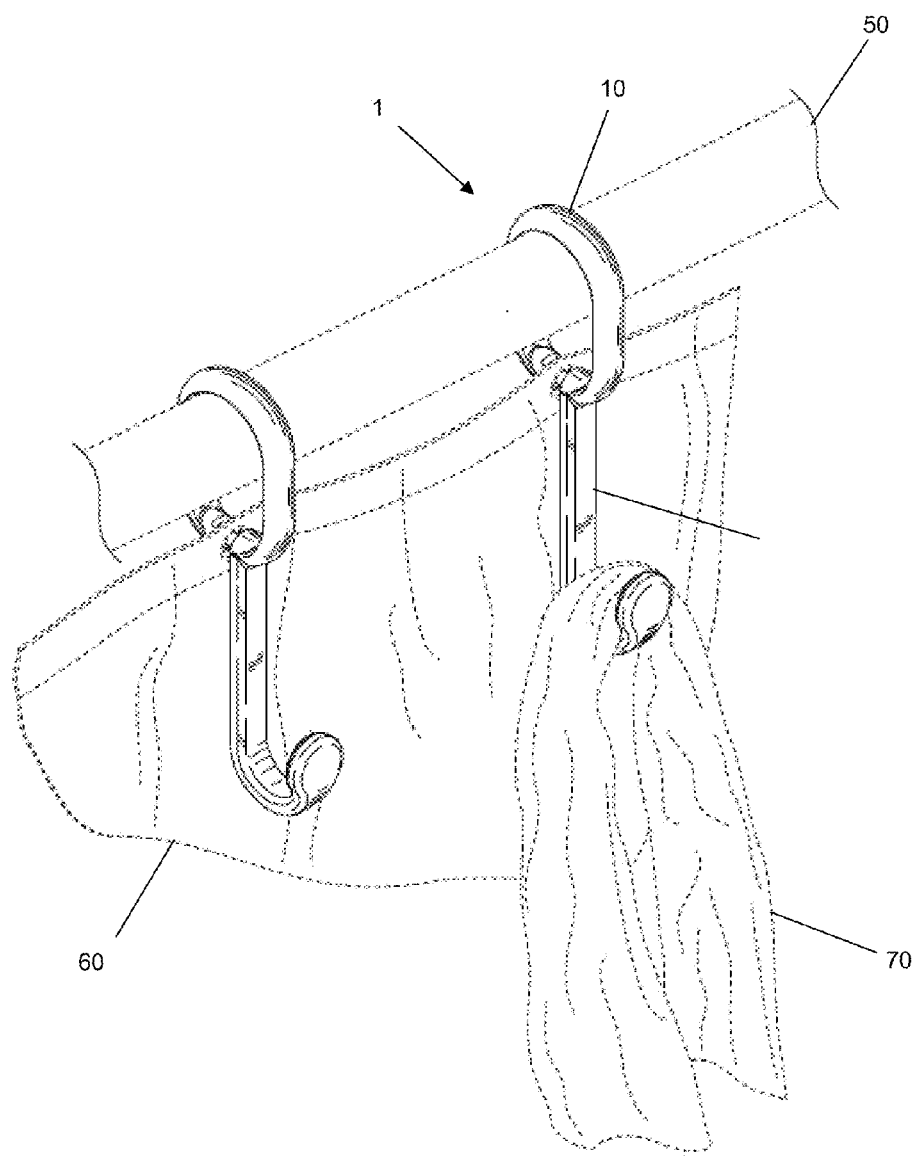
FIG. 1 is a perspective view of a shower curtain hook according to an exemplary embodiment of the present invention in its environment, showing a shower curtain rod, a shower curtain, and a towel or garment.
Figure 2:
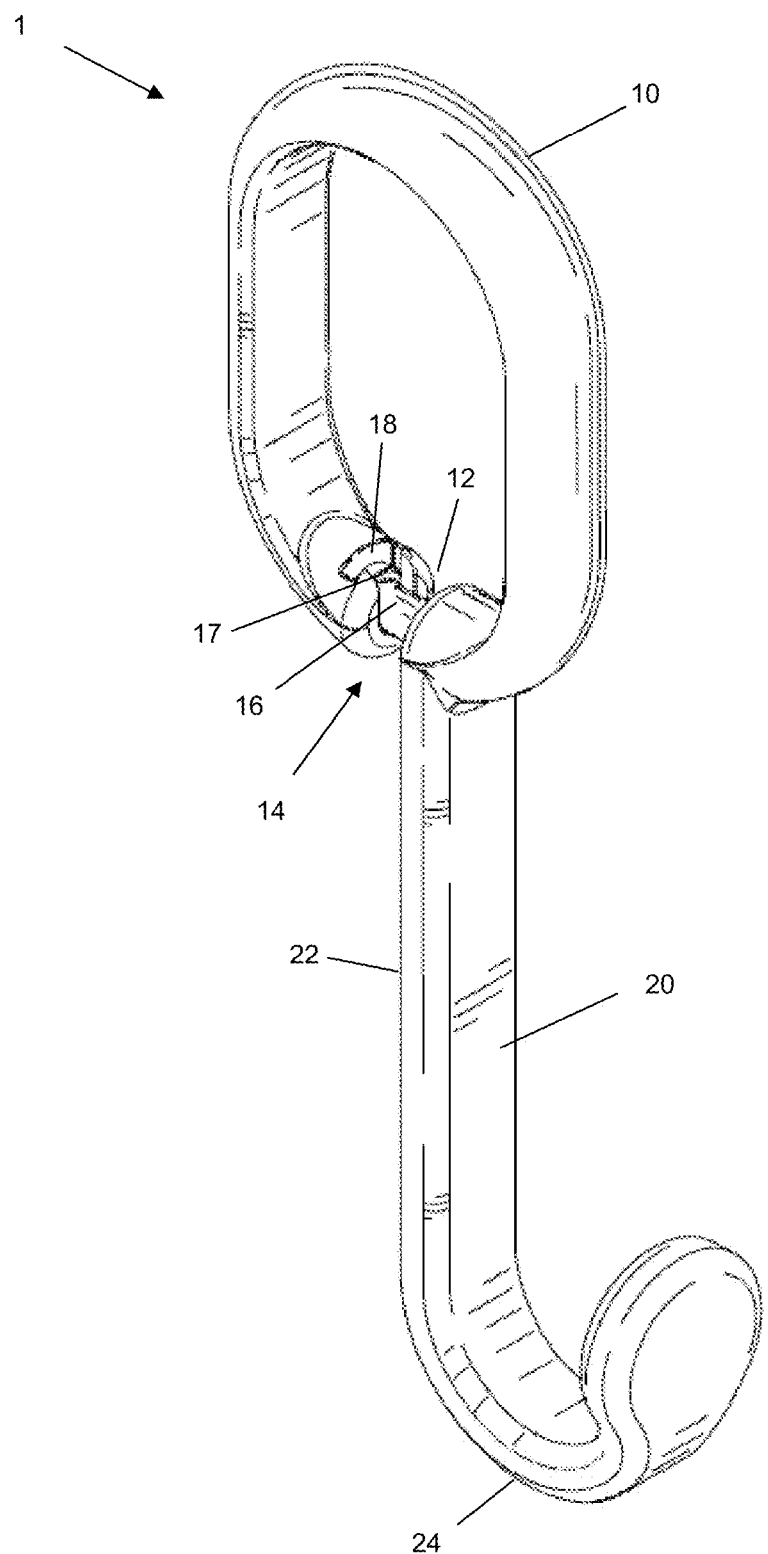
FIG. 2 is a perspective view of the shower curtain hook of FIG. 1.
Figure 3:
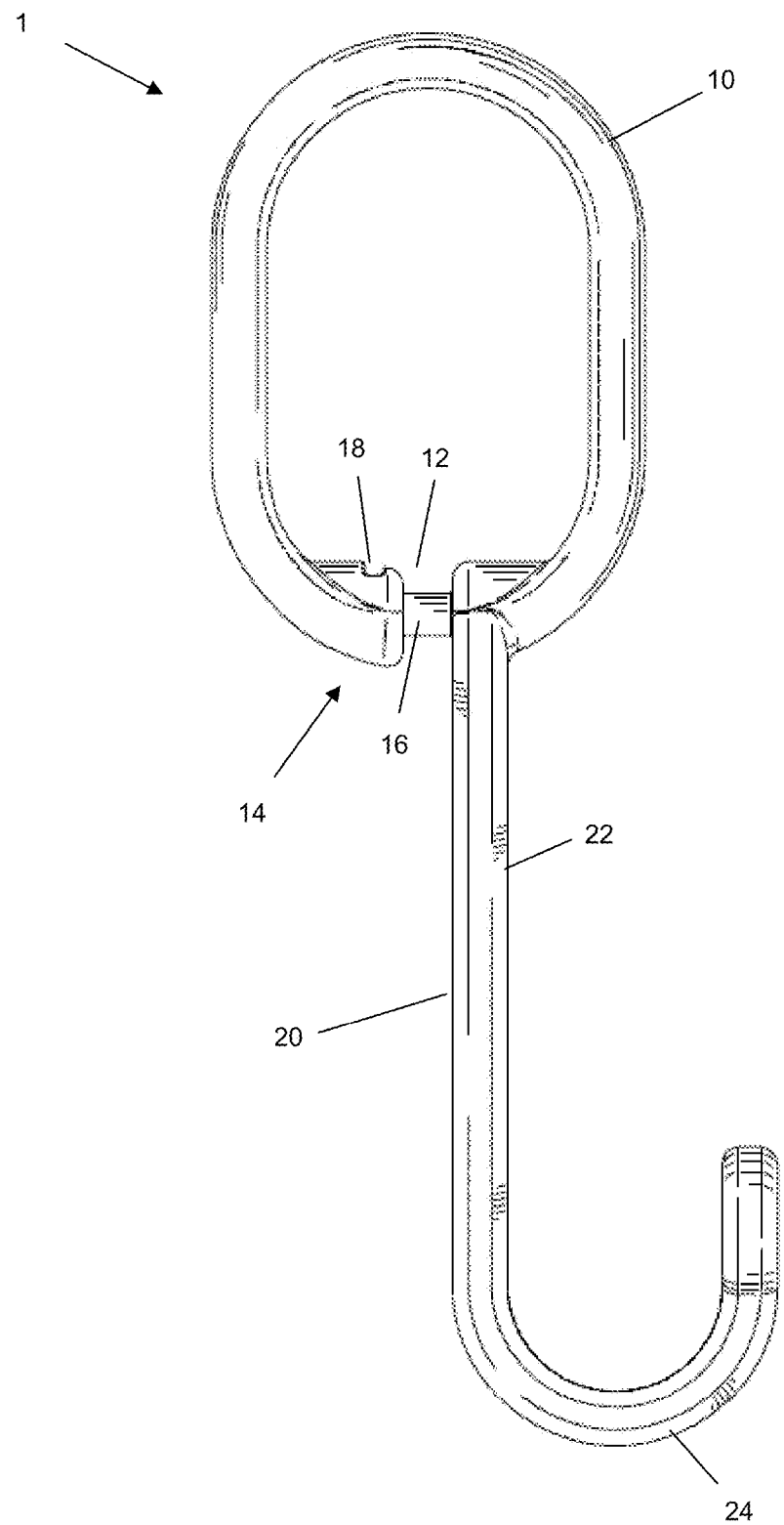
FIG. 3 is a front plan view of the hook of FIG. 1.

FIGS. 1-3 illustrate a shower curtain fastener according to an exemplary embodiment of the present invention.

The shower curtain fastener 1 is fabricated of a rigid or semi-rigid material, such as metal, plastic, an elastomer, or the like. Such materials are substantially impervious to water, humidity, and elevated temperatures that are common in a bathroom environment. The shower curtain fastener 1 is shown in the drawings as an integral part formed by an injection molded process, but may alternatively be formed as an assembly of separate pieces.

The shower curtain fastener 1 may include a body portion 10 and a hook portion 20 extending from the body portion 10. The body portion 10 is used to attach the fastener to a shower curtain rod 50 and to support a shower curtain 60, while the hook portion 20 is used to hang other items 70 apart from a shower curtain, such as a towel, clothing garments, or the like.

The body portion 10 is shown as being a substantially elliptical ring shape, but may any number of other shapes, such as circular, D-shaped, pear shaped, or free form. The body portion 10 may include an opening 12 through which the rod 50 and curtain 60 are inserted. A locking closure 14 may be used to releasably secure the fastener 1 and curtain 60 to the rod 50. The locking closure 14 may extend across the span of the opening 12 to prevent the curtain 60 and rod 50 from slipping out of the fastener 1.

In one embodiment such as shown in the drawings, the locking closure 14 comprises a slide lock. The slide lock includes a protruding portion 16 extending from the body portion 10 at one side of the opening 12. The distal end of the protruding portion 16 includes an enlarged head 17, such as a disk, bulb, or the like. The head 17 is inserted into a socket 18 formed in the body portion 10 near or adjacent to the opposite end of the opening 12. When the fastener 1 is formed from a semi-rigid material, the flexibility of the material will allow for enough movement of the protruding portion 16 to open and close the slide lock. In other embodiments, the locking closure 14 may be any one of a number of other locking mechanisms, such as a clasp, latch, gate, hook, or the like.

Figure 4:
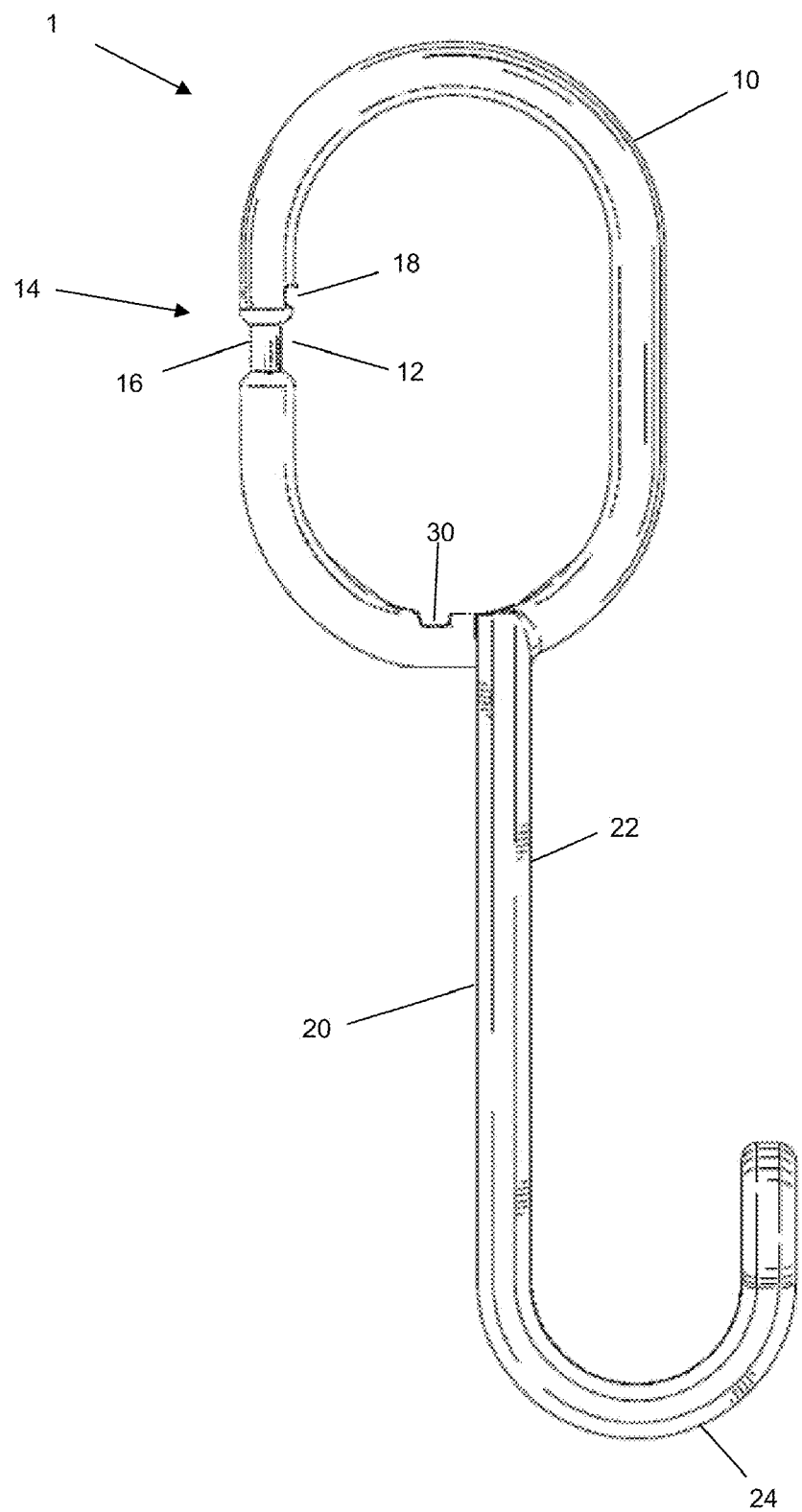
FIG. 4 is a front plan view of a hook according to another exemplary embodiment of the present invention.

The opening 12 and locking closure 14 may be located on a side or bottom section of the body portion 10. In one embodiment such as shown in FIGS. 1-3, the opening 12 and locking closure 14 are located at the bottom section of the body portion 10. As such, when the locking closure 14 is closed, the shower curtain 60 may rest on the locking closure 14. In another exemplary embodiment as shown in FIG. 4, a notch 30 may be formed on the lower inner circumferential surface of the body portion 10 in which the shower curtain 60 may rest. The notch 30 may serve to hold the shower curtain 60 in a substantially stationary position along the circumference of the body portion 10. The shower curtain 60 will hang from the bottom section of the ring-portion, thus at least one of the locking closure 14 or notch 30 is preferably located at the bottom section of the body portion 10. One of the locking closure 14 or notch 30 may be substantially centered at the bottom section of the body portion 10, or located at least a slight offset from center.

The hook portion 20 includes an upper segment 22 that extends substantially vertically downward from the outer surface of the bottom section of the body portion 10. The hook portion 20 includes a lower segment 24 that extends outward and/or upward to provide a surface on which to hang the other item 70 apart from the shower curtain. For example, the lower 24 segment may extend outwardly and curve upwardly so that it extends substantially parallel to the upper segment 22 in a U-shape. It is preferable that the lower segment 24 of the hook portion 20 is extended away from the water source in the shower to keep the item dry, but may alternatively be extended toward the shower if it is so desired. The hook portion 20 may be substantially centered at the bottom section of the body portion 10, or located at least a slight offset from center.

It is preferable that the location for hanging the shower curtain 60 (e.g., the locking closure 14 or notch 30, and the location for hanging the other item 70 on the fastener 1 (e.g., the hook portion 20) are in relatively close proximity to each other to inhibit the fastener 1 from rotating around the rod 50. However, if so desired, the locking closure 14 or notch 30 may be offset from the hook portion 20 at a distance that is configured to counter-balance the weight of the shower curtain 60 and the other hanging item 70, thereby inhibiting the fastener 1 from rotating around the rod 50.

Now that embodiments of the present invention have been shown and described in detail, various modifications and improvements thereon will become readily apparent to those skilled in the art. Accordingly, the exemplary embodiments of the invention, as set forth above, are intended to be illustrative, not limiting. The spirit and scope of the present invention is to be construed broadly and limited only by the appended claims, and not by the foregoing specification.

What is claimed is:

1. A shower curtain fastener comprising:
  a ring-shaped body portion having an opening for receiving a shower curtain rod and a shower curtain, said body portion being adapted to couple said shower curtain to said shower curtain rod and said body portion includes a notch along its inner circumferential surface for receiving the shower curtain; and
  a hook portion formed integrally with the body portion, the hook portion having a first segment extending substantially vertically downward from a bottom section of the body portion and a second segment extending outwardly to receive hanging items apart from the shower curtain.

2. The shower curtain fastener of claim 1, further comprising a locking closure for releasably securing said body portion around said shower curtain rod.

3. The shower curtain fastener of claim 2, wherein the locking closure is a slide lock.

4. The shower curtain fastener of claim 3, wherein the slide lock comprises a protruding portion extending from the body portion at one end of the opening, the distal end of the protruding portion having an enlarged head which is adapted to be inserted into a socket formed within the body portion adjacent the opposite end of the opening.

5. The shower curtain fastener of claim 1, wherein the hook portion is substantially centered at the bottom section of the body portion.

6. The shower curtain fastener of claim 1, wherein the notch is substantially centered at the bottom section of the body portion.

7. The shower curtain fastener of claim 1, wherein the notch is located substantially adjacent to the hook portion.

8. The shower curtain fastener of claim 1, wherein the notch and the hook portion are offset at a distance to counterbalance the weight of the shower curtain and the item received thereon.

9. The shower curtain fastener of claim 1, wherein the body portion is substantially ring shaped.

\* \* \* \* \*